United States Patent [19]

Kim

[11] Patent Number: 4,598,610

[45] Date of Patent: Jul. 8, 1986

[54] AUTOMATIC STEPLESS TRANSMISSION EQUIPMENT

[76] Inventor: Young I. Kim, 103, Jae Won Apartment Ka Dong, 318-4, Kye San-Dong, Buk-Ku In Chun-City, Kyung Ki-do, Rep. of Korea

[21] Appl. No.: 482,607

[22] Filed: Apr. 6, 1983

[30] Foreign Application Priority Data

Apr. 10, 1982 [KR] Rep. of Korea ................. 1982/1578

[51] Int. Cl.[4] ........................ F16H 37/06; F16H 3/74
[52] U.S. Cl. .................... 74/682; 74/752 B
[58] Field of Search ................. 74/740, 750 R, 752 R, 74/682, 705, 752 B, 751, 720.5, 674, 789, 758, 759, 470; 192/106.2; 464/62, 66, 67, 73, 76

[56] References Cited

U.S. PATENT DOCUMENTS

| | | | |
|---|---|---|---|
| 1,091,520 | 3/1914 | Little | 464/67 |
| 2,002,115 | 5/1935 | Kjaer | 464/67 |
| 2,234,384 | 3/1941 | Ryan | 74/752 B |
| 3,429,200 | 2/1969 | Green | 74/674 |
| 3,765,269 | 10/1973 | Watson | 74/682 |
| 3,770,879 | 11/1973 | Watson | 74/682 |
| 3,837,237 | 9/1974 | Rossler et al. | 74/740 |
| 4,080,847 | 3/1978 | Thomas | 74/751 |
| 4,178,813 | 12/1979 | Smemo | 74/740 |
| 4,470,326 | 9/1984 | Schmidt | 74/705 |
| 4,497,220 | 2/1985 | Grinde | 74/789 |

FOREIGN PATENT DOCUMENTS

| | | | |
|---|---|---|---|
| 1397001 | 6/1975 | United Kingdom | 74/740 |
| 0875140 | 10/1981 | U.S.S.R. | 74/740 |

Primary Examiner—Lawrence J. Staar
Assistant Examiner—David A. Novais
Attorney, Agent, or Firm—Birch, Stewart, Kolasch & Birch

[57] ABSTRACT

An automatic stepless transmission including a high speed gear system and a distribution gear train. An input of the high speed gear system is distributed by the distribution gear train. A high speed counter gear train and a junction gear train are provided. An output of the high speed gear system is produced through the distribution gear train, the high speed counter gear train and the junction gear train. A low speed gear system, a spring type high and low adjustment gear train and a low speed outer counter gear train are provided. An auxiliary adjustment gear train is operatively connected to the low speed gear system. An inner counter gear train is operatively connected to the low speed gear system. An input of the low speed gear system is distributed by the distribution gear train and an output of the low speed gear system is produced through the distribution gear train the spring type high and low adjustment gear train and the junction gear train via the low speed outer counter gear train or the auxiliary adjustment gear train and the inner counter gear train. A neutral clutch train is operatively provided and a neutral gear train is operatively positioned at the output of the high and low speed gear systems. A main adjustment gear train is operatively connected to a sensitive adjustment gear train wherein the load on the output in the high and low speed gear systems is selectively regulated by the main adjustment gear train and auxiliary gear train depending on speed changes.

6 Claims, 18 Drawing Figures

FIG 4
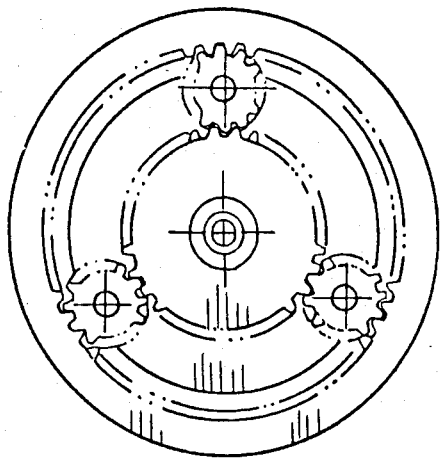
| Gears | Tooth Ratio |
|---|---|
| Sun gear | 2 |
| Internal gear | 4 |
| Planetary gear | 1 |
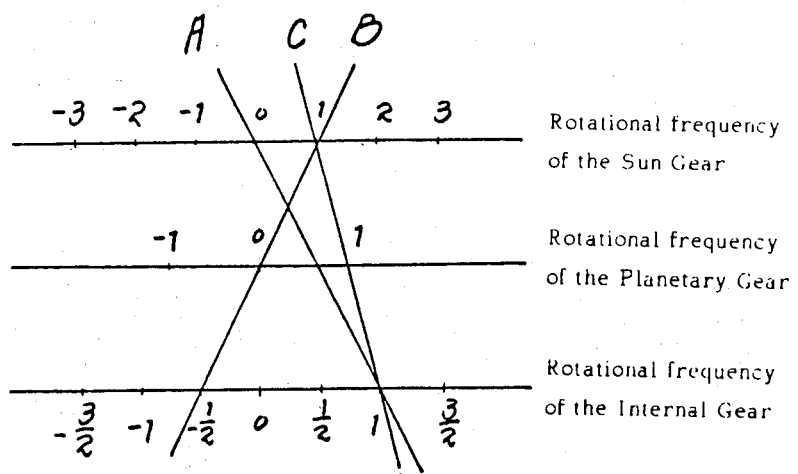

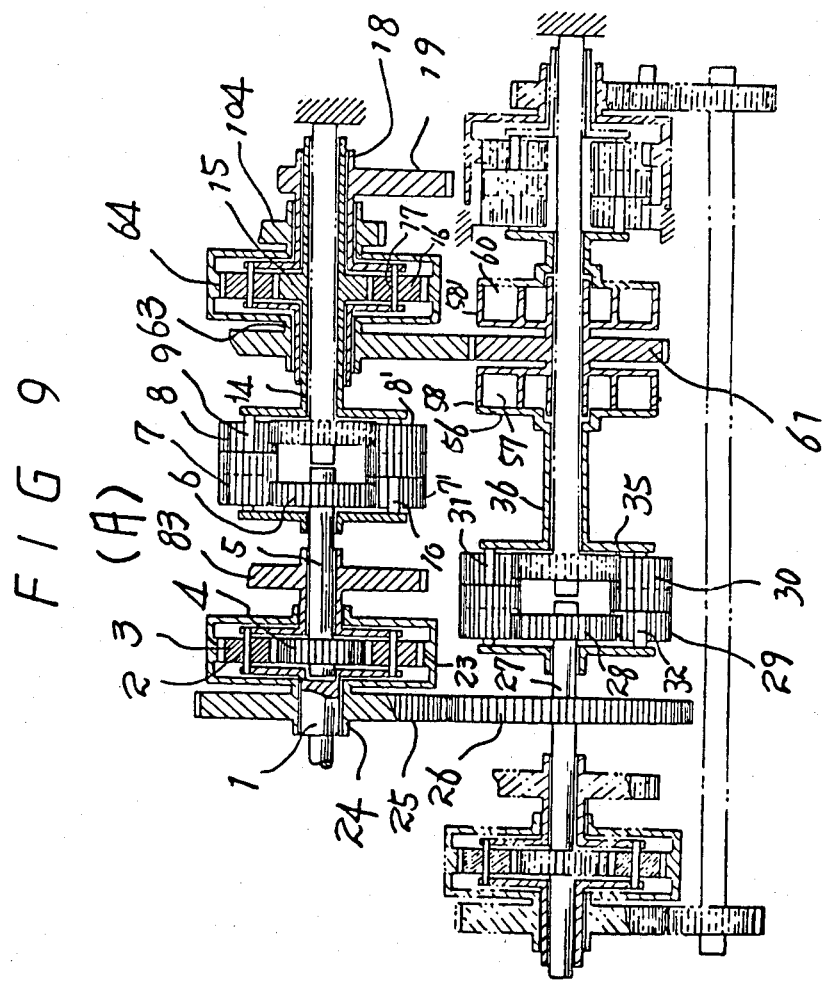

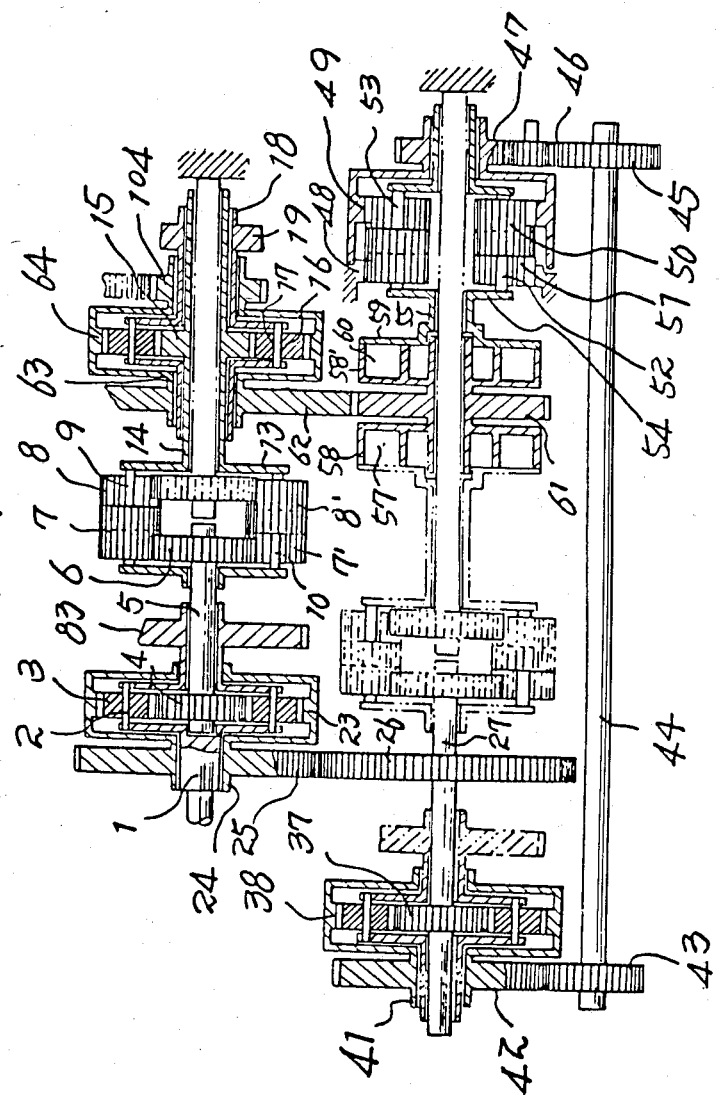

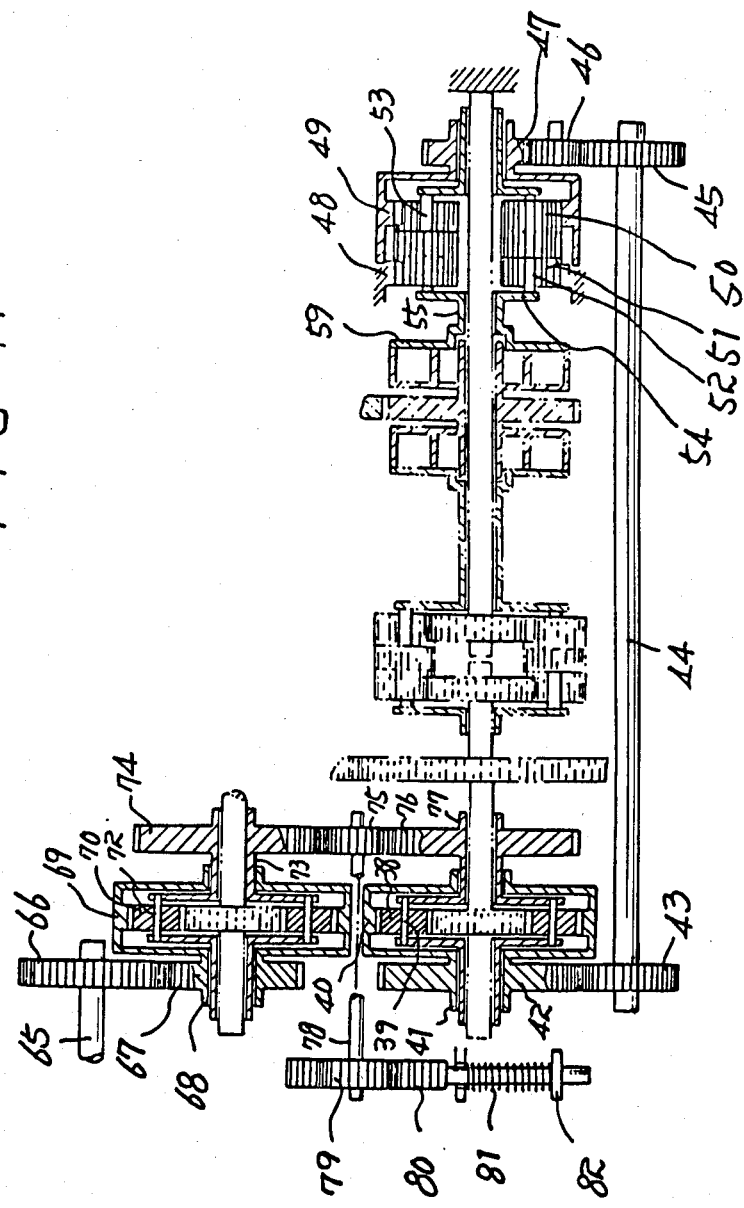

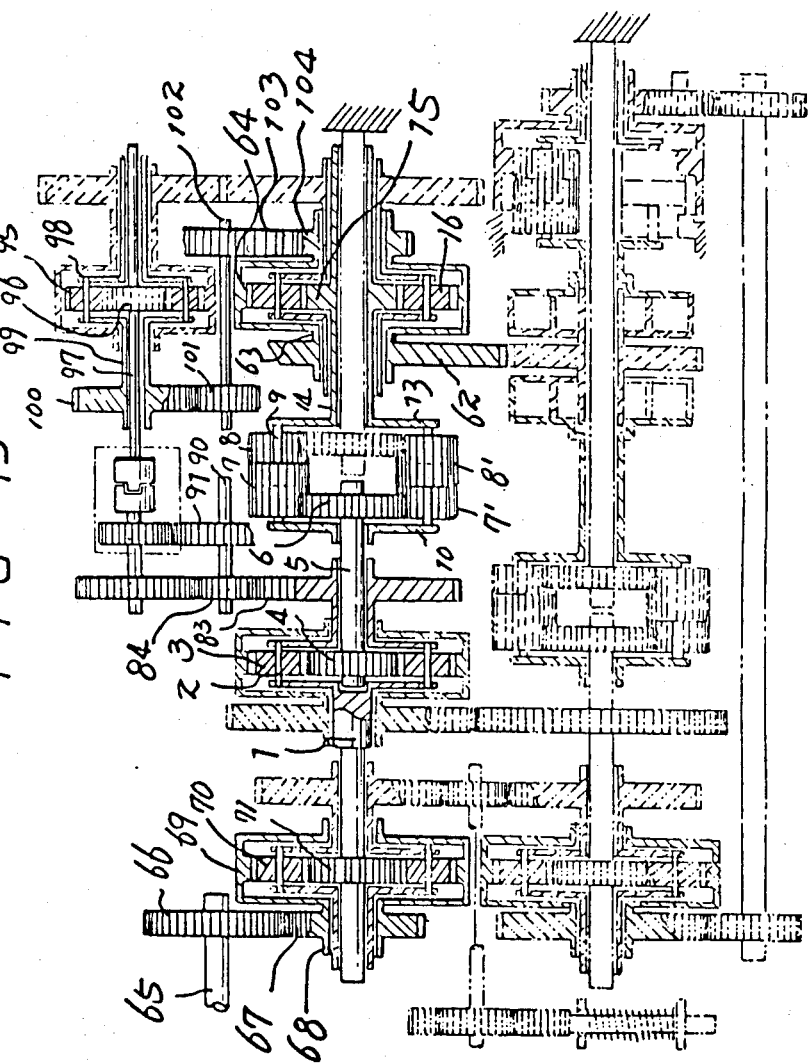

AUTOMATIC STEPLESS TRANSMISSION EQUIPMENT

BACKGROUND AND SUMMARY OF THE INVENTION

Field of the Invention

The present invention relates to an automatic stepless transmission equipment used in a common transmission which controls the speed steplessly and automatically by means of rotation between input and output according to the change of load.

The present invention is composed only of the combination of total gears without a clutch and does not include a defect in the mechanism such as disengagement of gears while operating, which is characterized in shifting the power corresponding to the load imposed to the output automatically and steplessly.

The present invention is composed of the combination of various kinds of gears and control springs, and comprises a transmission, a sensitive adjustment gear train, a neutral gear and a commonly known reverse gear which is not illustrated in the drawings. Especially, the transmission includes a high speed system and two low speed systems which may steplessly shift the rotation corresponding to the burden of the output.

Generally, transmissions have performed automatically or manually through a hydraulically-operated or mechanical clutch. The input is converted to the output through the routine transmission and the degrees thereof are limited from 3 to 8. In order to shift automatically and steplessly or to adapt the transmission to a certain use in power machinery, a problem is established wherein numerous degrees of transmission or of manufacturing special equipment according to the nature of a power machinery is required.

To solve such problems, the present invention makes it possible to shift steplessly and automatically within the confined equipment and to adapt it to any use of power machinery.

For a better understanding, the present invention may be divided into three parts, i.e., the transmission part for delivering high and low speeds, the sensitive adjustment gear train part for perceiving and controlling the load imposed to the output, which is to be delivered to the input and the neutral gear train part which is inoperative when no transmission occurs. Among the constitutions, the transmission part may be divided into four divisional parts, namely, a distribution gear train for distributing the input to a high speed system and a low speed system, a junction gear train for joining the distributed powers and delivering them to the output, counter gear trains include a high speed counter gear train, an inner counter gear train for low speed, an outer counter gear train for low speed. The counter gear trains pass the impulse of delivering the power only to the low speed system under normal conditions wherein no load is imposed and counterbalances the power between the high speed system and the low speed system. Further, a spring type low speed adjustment gear train is provided for connecting the low speed systems to the output.

The sensitive adjustment gear train part may be divided into three division parts, i.e., an adjustment gear train for controlling the preceived load, a main adjustment gear train and an auxiliary adjustment gear train which assist the adjustment gear train.

The neutral gear train part is composed of a neutral gear train which is inoperative when the input and the output are disconnected, and a neutral clutch.

Among the constituents, the distribution gear train, the junction gear train, the auxiliary adjustment gear train, the main adjustment gear train and the neutral gear train are all composed of differential gears of the same kind, which are given different names according to their functions.

If the magnification of rotation of the output to the input is high, the input shaft needs a large amount of power and, to the contrary, if the magnification of rotation of the output to the input is low, the input shaft needs less power. Such changes of power imposed to the input shaft are perceived by the adjustment gear train of the sensitive adjustment gear train part. As the spring rack gear moves up and down, the inner counter gear for the low speed part moves forward or backward to the outer counter gear train to be corresponded to the counter gear train of the high speed part. Consequently, the input works on the output through the high speed system or the low speed system, which results in change of speed of the present invention.

Further scope of applicability of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a composition view of a differential gear of the present invention and the comparative table between gears thereof;

FIGS. 9(A) and 9(B) is a circuit diagram of a transmission part of the present invention, 9(A) is the circuit diagram of output through inner counter gear train (high speed), 9(B) is the circuit diagram of output through outer counter gear train (low-speed);

FIG. 11 is an illustration of the sensitive adjustment gear trains of the present invention;

FIG. 15 is an illustration of the drive gear train of the present invention in neutral.

DETAILED DESCRIPTION OF THE INVENTION

Figure 1:
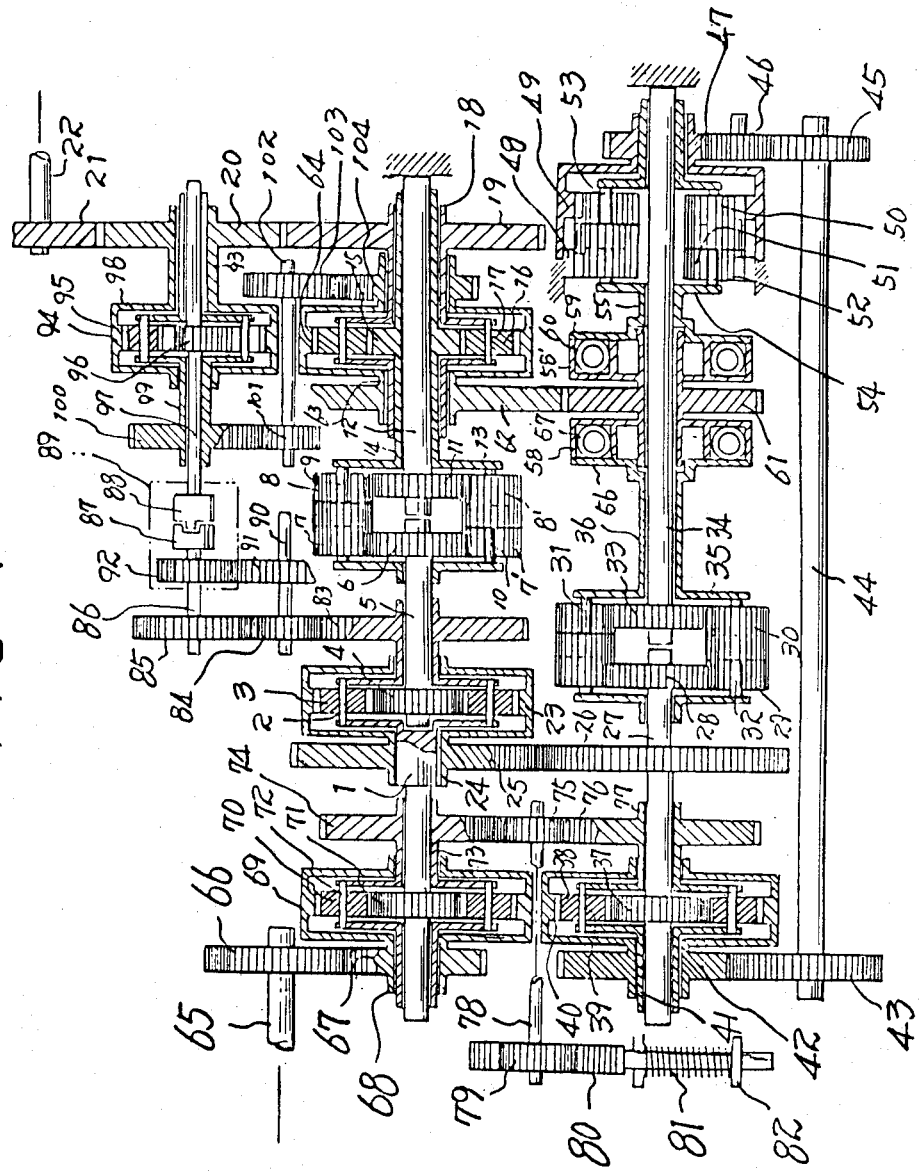
FIG. 1 is a whole illustration of the present invention.
Figure 2:
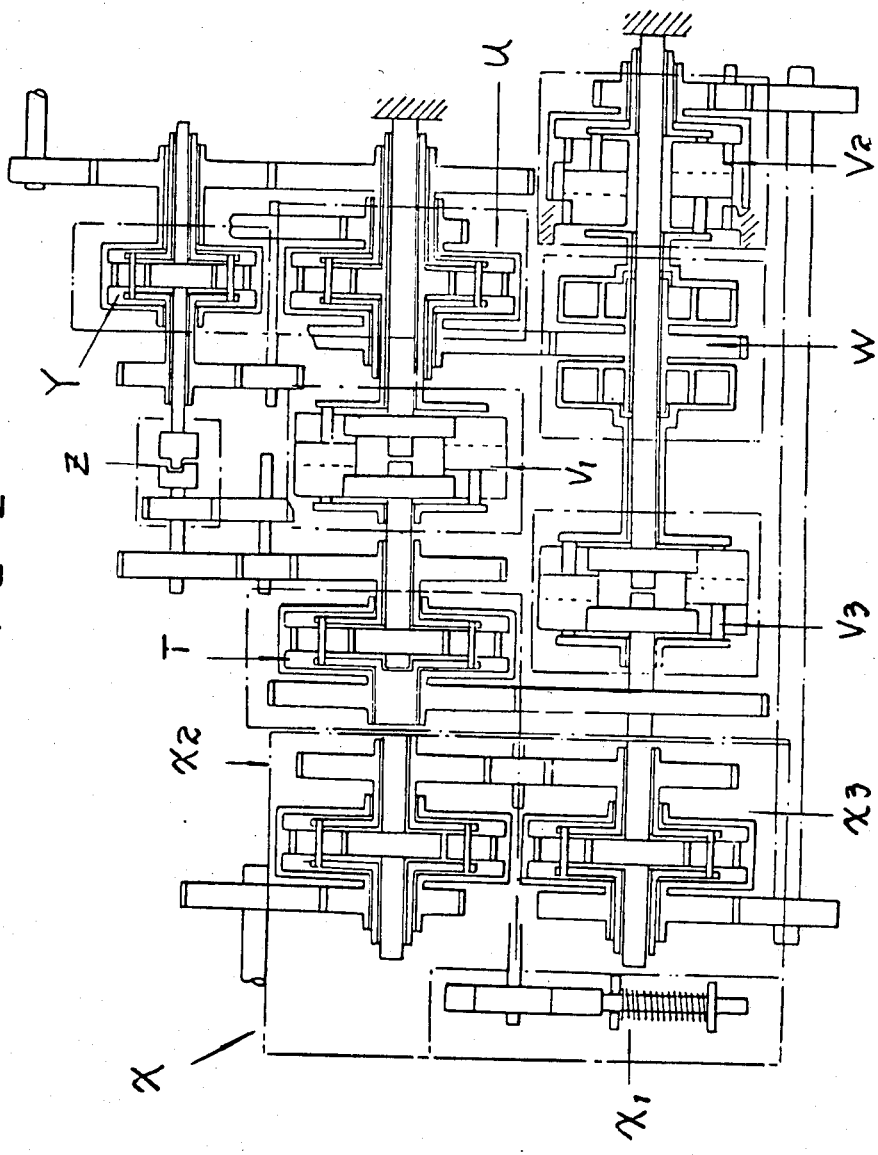
FIG. 2 is a schematic diagram of the structural parts of the invention.

As illustrated in FIGS. 1 and 2, a distribution gear train T and a counter gear train $V_1$ of high speed parts are linked with a main shaft 5. A junction gear train U is linked with a main shaft 14 of the counter gear train $V_1$. A drive gear 26 of a low speed system is linked with an external gear 25 of the distribution gear train T, and provides output to the shaft 27. A spring type high and low adjustment gear train W and an inner counter gear train $V_2$ of the low power system are linked together and also engage the outer counter gear train $V_3$ of the low speed system and the junction gear train U. The input from the external gear 25 ot the distribution gear train T and drive gear 26 of the low power system are connected to a main adjustment gear train $X_2$ and an auxiliary adjustment gear train $X_3$ is annexed thereto. A drive gear 74 and an angle gear 76 of main adjustment gear train $X_2$ and the auxiliary adjustment gear train $X_3$ are linked with the adjustment gear train X through the idle gear 75.

As shown in FIGS. 1, 2 and 4, the distribution gear train T, the junction gear train U, the main and the auxiliary adjustment gear train $X_2$, $X_3$ of the differential gears are respectively linked by each planetary gear 3, 16, 38, 70 which are engaged with each main drive gear 4, 15, 37, 71 centered in each internal gear 23, 40, 64, 69, and each gear has a shaft having input and output functions. As shown in FIGS. 2 and 5-(B), each other counter gear train $V_1$, $V_3$ of the high and low power systems of the counter gear train $V_2$ include in their centers stationary shafts 12, 34 with a drive gear confronting each other with the first and the second link gears engaged respectively on their circumferences, and the link gears including the same main gear shafts 14, 36 linked by their supporting pins 13, 35.

Figure 5A:
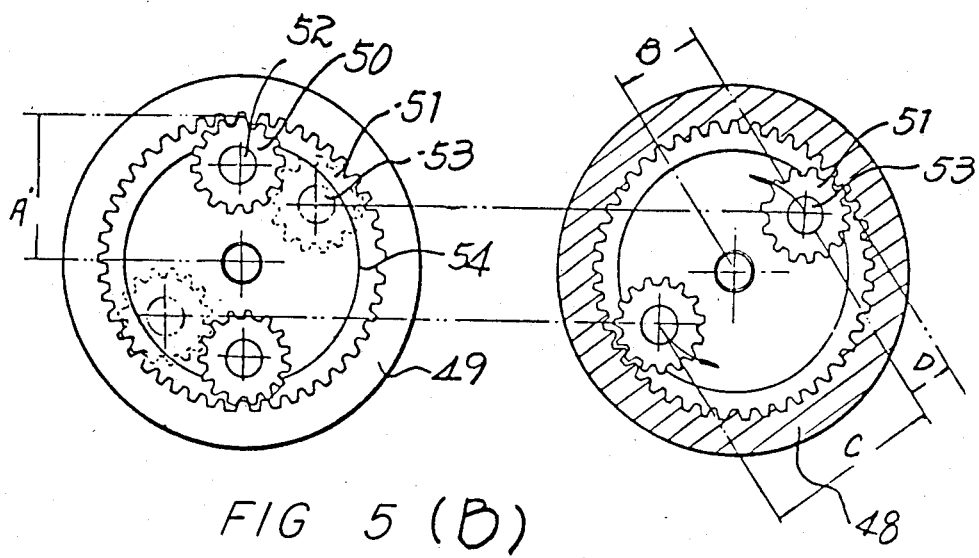
FIGS. 5A and 5B is an illustration of the counter gear train of the present invention.

As shown in the FIGS. 1 and 5A, the inner counter gear train $V_2$ of the low speed system includes a stationary internal gear 48 and an internal gear 49 on the external side of the stationary gear shaft 34. Further, the first and the second link gears are linked laterally on the internal side, and the link gears include the same shaft 55 linked by the supporting pin 54.

Figure 6:
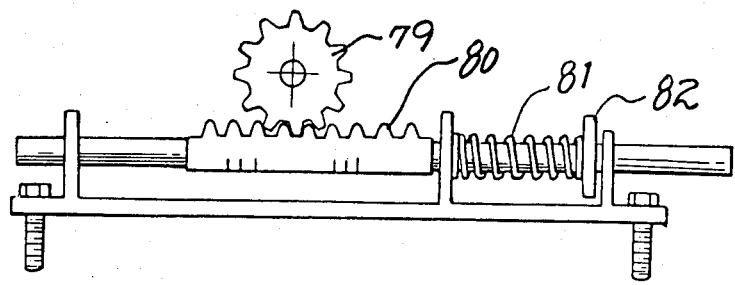
FIG. 6 is an illustration of the main adjustment gear train.
Figure 7:
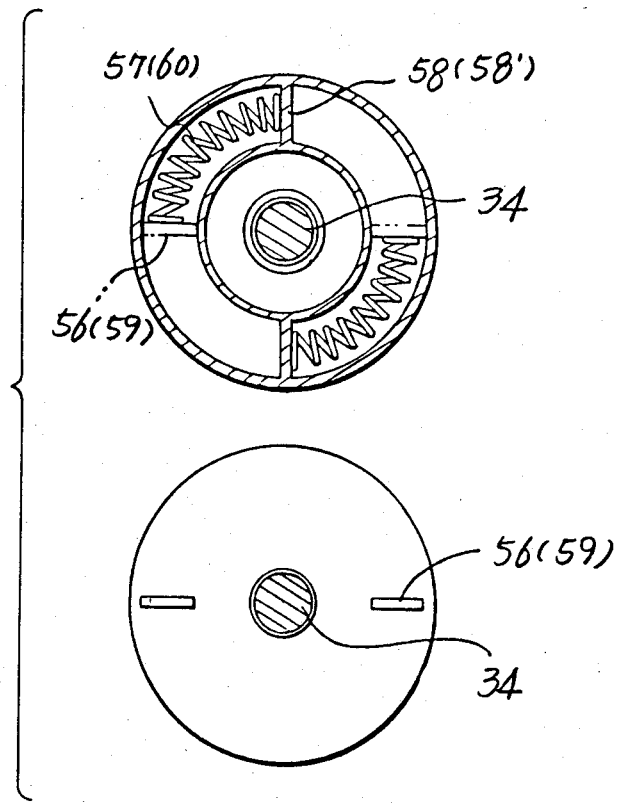
FIG. 7 is an illustration of the spring type high and low speed adjustment gear train of the present invention.

As shown in the FIGS. 6 and 7, the adjustment gear train, the adjustment spring gear 79 engages a rack gear 80 which is flexibly mounted by a spring 81 and linked with the idle gear 75.

As shown in the FIGS. 1, 2 and 7, the spring type high and low speed adjustment gear train W includes a spring drive gear 61 with inner parts of both sides thereof having a high and low speed spring fixing plates 58, 58' for each high and low speed springs 57, 60.

Figure 8:
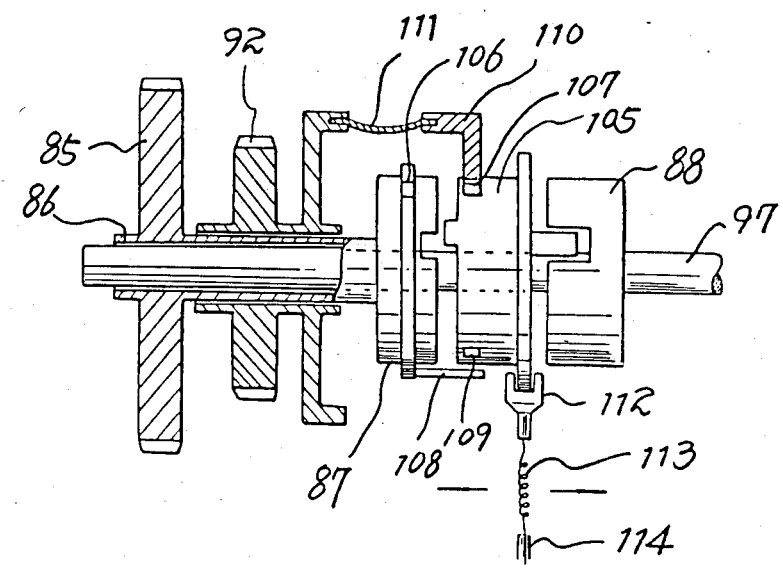
FIG. 8 is an illustration of a neutral part of the clutch of the present invention.

The neutral gear train Y includes the same structure as that of the distribution gear train T. The structure of the neutral clutch train is as shown in the FIGS. 1 and 8.

Every differential gear used in the present invention includes a sun gear, planetary gear and internal gear respectively. Each gear includes a separate shaft as shown in FIG. 4. The ratios of rotation between the component gear of the differential gear are as shown in the table. Namely, in case of A in the table, if the sun gear stops (rotation number is zero) and the internal gear rotates one time, the planetary gear rotates two third. In case of B in the table, if the planetary gear stops and the sun gear rotates one time, the internal gear rotates one-half in the reverse direction. In the case of C in the table, if the sun gear and the internal gear rotate one time concurrently in the same direction, the planetary gear also rotates one time in the same direction. As illustrated above, the table shows the mutual relation of rotation magnification between each component gear through the curves A, B and C.

Figure 3:
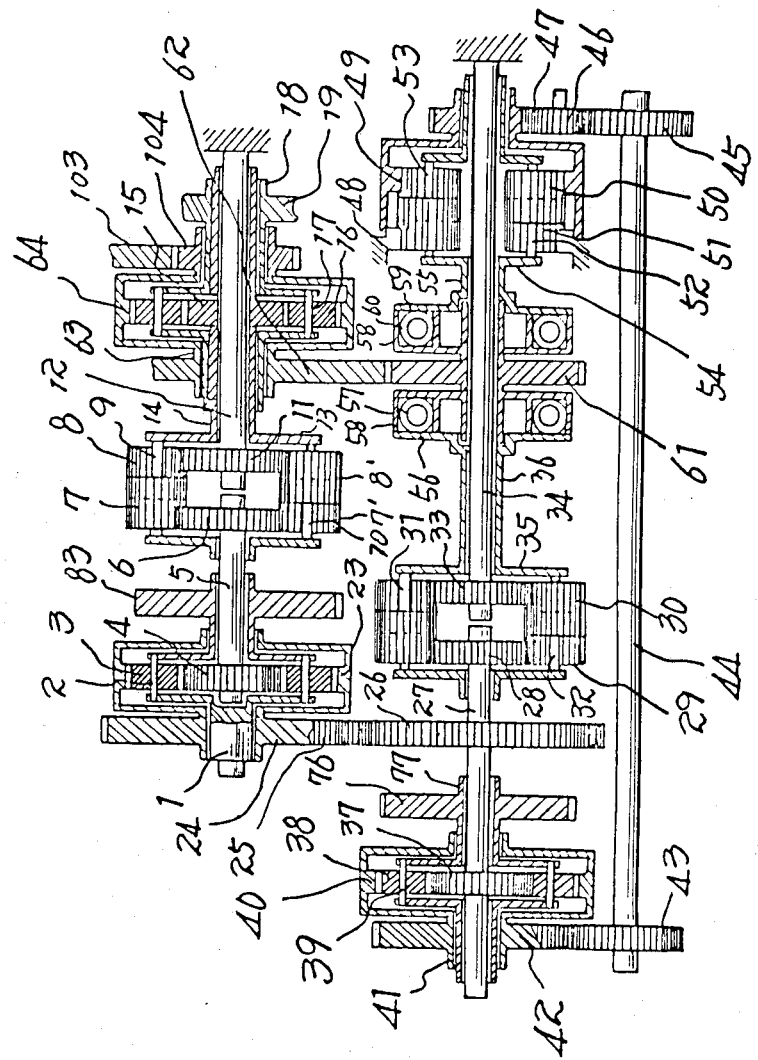
FIG. 3 is an illustration of a transmission part of the present invention.

The operation of the present invention shall be explained according to the composition and systems as follows. The transmission part includes two power delivering systems as shown in the FIGS. 1, 3 and 10. Namely, a high speed system starts from the distribution gear train T, passes the counter gear train $V_1$ of high speed system and finally reaches the junction gear train U. One low speed system starts from the distribution gear train T, passes the outer counter gear train $V_3$ of the low speed system and the spring type high and low speed adjustment gear train W in order and finally reaches the junction gear train U, which is directly connected to the output part. Another low speed system also starts from the distribution gear train T, passes the auxiliary adjustment gear train $X_3$, the inner counter gear train $V_2$ of the low speed system, the spring type high and low speed adjustment gear train W in order and finally reaches the junction gear train U. As stated above, one high speed system and one low speed system are provided having two divisional courses.

The high and low speed systems shall be explained in detail from the main drive shaft 1 to the output gear 19 of the junction gear train as follows. As shown in FIG. 9, the high speed system reaches the output through the following power delivering course starting from the main drive gear 4 via the internal gear 23, to main drive gear shaft 5, to the drive gear 6 of the high speed counter gear train, to the high speed counter gear train, to the first link gear 7, to the second link gear 8, which rotates along with the circumference of the high speed stationary gear 11, and the link gear supporting plate 13 which rotates along with the link gear pins 9, 10, to the main drive shaft 14 of the junction gear train, to the main drive gear 15, to the planetary gear 16, to the planetary gear pin 17, to the planetary gear shaft and finally to the output gear 19 of the junction gear train.

Figure 12:
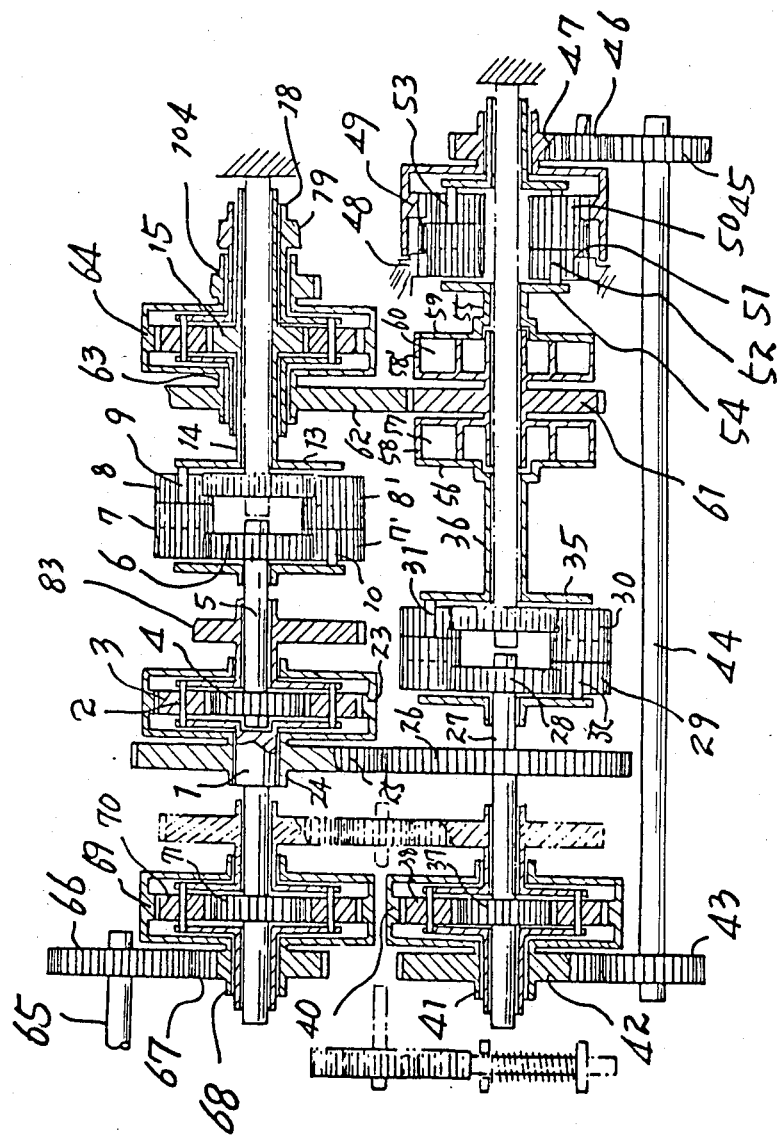
FIG. 12 is an illustration of the drive gear train of the present invention under normal condition.

As shown in the FIG. 12, the low speed system taking the outer counter gear train of the low speed system reaches the output through the following power delivering course starting from the main drive shaft 1 to the planetary gear pin 2 of the distribution gear train, to the planetary gear 3, which rotates along with the circumference of the main drive gear 4, to the internal gear shaft 24 by the rotation of the internal gear 23, and to the external gear 25 of the distribution gear train, to the drive gear 26 of the low speed system, to the angle gear shaft 27, to the driving gear 28 of the external counter gear train, to the first link gear 29, to the second link gear 30, which rotates along with the circumference of the stationary gear 33, and the link gear supporting plate 35 rotates along with the link gear pins 31, 32 and to the shaft 36 of the link gear supporting plate of the outer counter gear train of the low speed system, to the spring press plate 56 of the low speed system, to the low speed adjustment spring 57, to the spring fixing plate 58 by the low speed adjustment spring, to the spring drive gear 61, to the timing gear 62, to the internal gear shaft 63 of the junction gear train, to the internal gear 64, to the planetary gear 16, to the planetary gear pin 17, to the shaft 18 of the planetary gear and finally to the output gear 19 of the junction gear train.

As shown in the FIG. 12, the low speed system taking the inner counter gear train of the low speed system reaches the output through the following power delivering course starting from the main drive shaft 1, to the planetary gear pin 2 of the distribution gear train, to the planetary gear 3, to the internal gear 23, to the external gear 25 via the internal gear shaft 24, to the drive gear 26 of the low speed system, to the angle gear shaft 27, and to the main drive gear 37 of the main adjustment gear train, to the planetary gear 38, to internal gear 40, to the external gear 42, of the main adjustment gear train via internal gear shaft 41, to the idle drive gear 43, to the external shaft 44, to the drive gear 45, to the reverse gear 46, to the drive gear 47 of the inner counter gear train of the low speed system, to the internal gear 49, to the first link gear 50, to the second link gear 51, which rotates along with the inner circumference of the stationary gear 48, and the link gear supporting plate 54 which rotates along with the link gear pins 52, 53, to the link gear shaft 55, to the spring press plate 59 of the high speed system, to the high speed spring 60, to the spring drive gear 61 by the rotation of the spring press plate 58, to the timing gear 62, to the internal gear shaft 63 of the junction gear train, to the internal gear 64, to the planetary gear 16, to the planetary gear pin 17, to the planetary gear shaft 18, and finally to the output gear 19 of the junction gear train.

Concerning the relationship between the two courses of the low speed system, the two courses branch off at the driving gear shaft 27 of the low speed system, and join each other at the low speed spring 57 and the high speed spring 60.

Concerning the directions of rotation of the two courses of the low speed system, the courses have the same direction of rotation at the driving gear shaft 27 of the low speed system where the two courses meet, at the low speed spring press plate 56, at the high speed spring press plate 59, at the spring fixing plates 58,58' and at the spring gear 61.

Tracking each rotation number of the two courses according to the mutual teeth ratio, for one rotation of the driving gear shaft 27 of the low speed system where the two courses diverge, the spring gear 61 of the spring type adjustment gear train of the low speed system where the two courses meet rotates one-half. Namely, the two courses of the low speed system deliver the same speed of rotation as well as the same direction of rotation. In the course through the auxiliary adjustment gear train $X_3$ and the inner counter gear train $V_2$ of the low speed system, the angle gear 76, the angle gear shaft 77 and the planetary gear pin 39 connected thereto are inoperative.

In order to examine the influence both in the two courses when the angle gear 76 works, let's track the course when the rotation of the angle gear operates. The rotation of the angle gear presses the high speed adjustment spring 60 towards its rotation direction through the following course starting from the angle gear 76, to the angle gear shaft, to the planetary gear pin 39 of the auxiliary adjustment gear train, to the planetary gear 48, to the internal gear 40, to the internal gear shaft 41, to the external gear 42, to the drive gear 43 of the external shaft, to the external shaft 44 to the drive gear 45 of the external shaft, to the reverse gear 46, to the drive gear 47 of the inner counter gear train of the low speed system, to the internal gear 49, to the first link gear 50, to the second link gear 51, to the link gear supporting plate 54, which rotates by the link gear pins 52, 53, to the link gear shaft 55, to the high speed spring press plate 59, and finally to the high speed adjustment spring 60. Since the direction of rotation of the angle gear 76 is reverse to the direction of rotation of the internal gear 40 and the direction of rotation thereafter, this results in the final high speed spring press plate 59 retreating in direction at the conclusion of the above rotation.

Considering the mutual teeth ratio, the high speed spring press plate 59 rotates three seconds per one rotation of the angle gear 76. The result of the rotation of the angle gear 76 is another one than the rotation power passed from the adjustment gear train to the low speed system.

If the angle gear 76 rotates an angle of 10 degrees, the high speed spring press plate 59 rotates an angle of 15 degrees through the inner counter gear train $V_2$ of the low speed system. Thus, the degrees exceed or lack an angle of 15 degrees compared to that of the low speed spring press plate 56 through the outer counter gear train $V_3$ of the low speed system. Namely, there exist the difference of an angle of 15 degrees between the rotations of the two courses. Under this condition, the two courses work in the low speed system by rotating the adjustment spring gear 61 to deliver the power to the junction gear train U.

Let's examine the sensitive adjustment gear train X which operates the adjustment spring gear 61. As stated above, the operation of the angle gear 76 results in the low speed spring press plate 56 and high speed spring press plate 59 being moved forward or backward, and the two spring press plates 56, 59 pressing to rotate the fixing plate 58 by means of the low speed adjustment spring 57 and high speed adjustment spring 60 respectively. Namely, the two power delivering courses each have a spring 57, 60 to rotate the spring fixing plate 58 and the spring gear 61. If one of the two spring press plates 56, 59 rotates one time with one spring plate being forwarded, the forwarded spring plate will press the spring more strongly than the other spring press plate, and the spring fixing plate 58 and the spring gear 61 will be rotated mostly or only under the influence of the forwarded spring plate. Among the two courses of the low speed system, the forwarded part will influence the low speed system more heavily, and this depends on which directions and how many degrees the angle gear 76 rotates.

Comparing the high speed system with the low speed system and clarifying the relationship therebetween, we already considered the power delivering courses of the two systems. The magnification of rotation of each step for the input from the main drive shaft 1 to the output is enumerated as follows.

Assuming that the low speed system stands still, the rotation of the high speed system follows the following course with the indicated rotation numbers: the main drive shaft 1 (1 rotation)—the main drive gear of the distribution gear train 4 (3 rotations)—the drive gear of the high speed counter gear train 6 (3 rotations)—link gear supporting plate 13 (3/2 rotations), which is engaged with the stationary gear 11 via the link gear 8—main drive gear of the junction gear train 15 (3/2 rotations)—planetary gear shaft 18 (½ rotation), which is engaged with the internal gear 64 vias planetary gear 16—output gear of the junction gear train 19 (½ rotation). As shown in the above route, the output gear 19 rotates one-half a rotation while the main shaft 1 rotates one rotation.

In the low speed system, since the direction and magnification of rotation are identical in both of the two courses as stated above, discussion of one low speed delivering course will be sufficient.

Assuming that the high speed system stands still, the rotation of the low speed system follows the following course with the indicated rotation numbers: the main shaft 1 (1 rotation)—internal gear of the distribution gear train 23 (3/2 rotations)—external gear 25 (3/2 rotations)—drive gear 26 (3/2 rotations)—drive gear of the eternal counter gear train 28 (3/2 rotations)—link gear supporting plate 35 (¾ rotations), which is engaged with the stationary gear 33 via link gear 30—spring gear 61 (¾ rotation), which is linked with the spring press plate 56 and the spring fixing plate 58 by means of the adjustment spring 57—timing gear 62 (½ rotation)—internal gear of the junction gear train 64 (½ rotation)—planetary gear shaft 18 (⅓ rotation), of which planetary gear 16 rotates along the circumference of the sun gear output gear of the junction gear train 19 (⅓ rotation).

As a result, rotation magnification of the output to the input between the high speed system and the low speed system is ½ to ⅓, viz. 3 to 2.

Reviewing the relation between the rotation magnification of the whole transmission comprising high and low speed systems and the rotation number of the timing gear 62, in the high speed system, one rotation of the main shaft 1 corresponds to ½ rotation of the output with the timing gear 62 standing still, viz. the rotation number of the timing gear is zero. However, in the low speed system, the corresponding rotation number of the output is ⅓ rotation and that of the timing gear is ½ rotation, because the timing gear belongs to the low speed system.

Figure 10A:
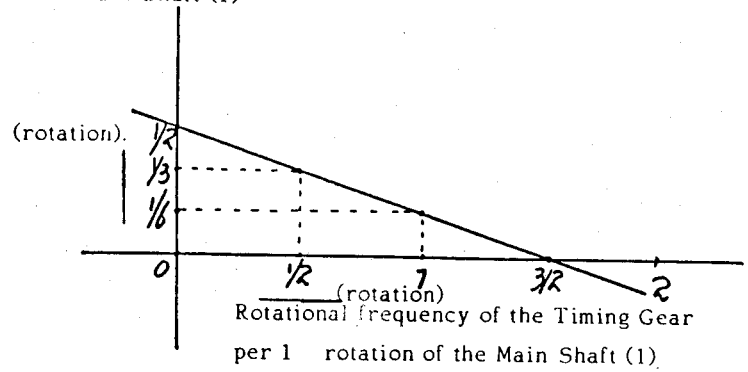
FIGS. 10(A) and 10(B) is a magnification table of rotation between output and rotation number of the present invention, 10(A) is the magnification table of the transmission assembly, 10(B) is the magnification table of the whole assemblies.
Figure 10B:
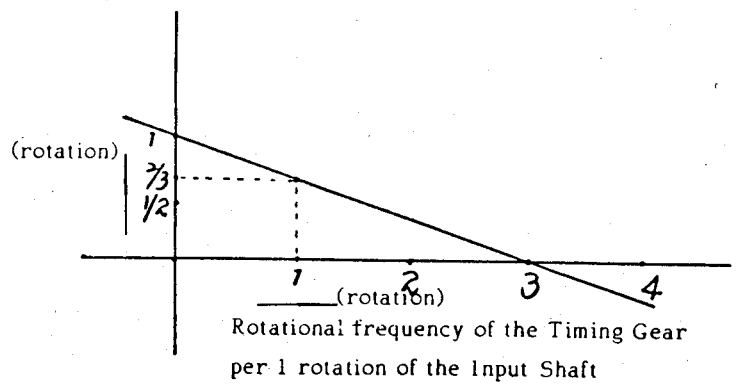

FIGS. 10A and 10B illustrate the rotation magnification of the output to the input together with the rotation number of the timing gear. For instance, in the condition where the main shaft makes one rotation and the timing gear also makes one rotation, the output will make 1/6 of a rotation.

As stated above in detail, the high speed system and the low speed system are different in their rotation magnification of the output to the input. However, the two systems do not deliver the power respectively but, being arranged in a row, one of them works much more than the other or both of them work together to an equal extent. Furthermore, in the situation where the high speed system rotates in a reverse direction, the corresponding power will return to the high speed system via low speed system. That is because the two systems are closed circuits with respect to each other.

If the angle gear 76 rotates in a large angle, the high speed spring press plate 59 retreats and exercises no influence upon the high speed adjustment spring 60. This explains that the course passing through the inner counter gear train V₂ of the low speed system is cut off under these circumstances. The power delivering course from the input of the main shaft 1 to the output will be the operation of the solid lined portion as shown in FIG. 9. As mentioned above, since each rotation magnification of the output to the input is ½ rotation of the high speed system and ⅓ rotation of the low speed system respectively, under normal conditions, the input of the main shaft 1 will have to take only the low speed system, which rotates slowly and gives the output stronger power. Furthermore, as the power of the low speed system is stronger than that of the high speed system at the ratio of 3 to 2, the two powers are delivered through each system and meet at the junction gear train which will rotate the high speed system in the reverse direction than return to the low speed system. The state is like the output magnification to the input being zero when the main shaft makes 1 rotation and the timing gear makes 3/2 rotation as illustrated in the FIG. 10A.

In the same way, if the angle gear 76 rotates in a large angle in the reverse direction as shown in solid lines in FIG. 9A, each rotation magnification of the output to the input of the two systems is constant like the case of passing the outer counter gear train V₃ in the low speed system, but under normal conditions, the input is not willing to pass only the low speed system like the case of passing the outer counter gear train V₃ in the low speed system. This operation is a result of the different shaped counter gear train being symmetrized in both high and low speed systems. The high speed system has the high speed counter gear train V₁ and the low speed system has the low speed inner counter gear train V₂. Under normal conditions, the input has to pass only the low speed system in light of each rotation magnification but, when the low speed inner counter gear train V₂ and the high speed counter gear train V₁ are symmetrized with respect to each other, heavy power is levied on the high speed counter gear train V₁ rather than on the low speed inner counter gear train V₂, and such an advantage of the counter gear train V₁ comes to check the power of passing only the low speed system.

The reason why heavy power is levied on the high speed counter gear train V₁ rather than on the low speed inner counter gear train V₂ is set forth below. The principles of structure of both of the counter gear trains are illustrated in the FIGS. 5A and 5B, respectively.

Figure 5B:
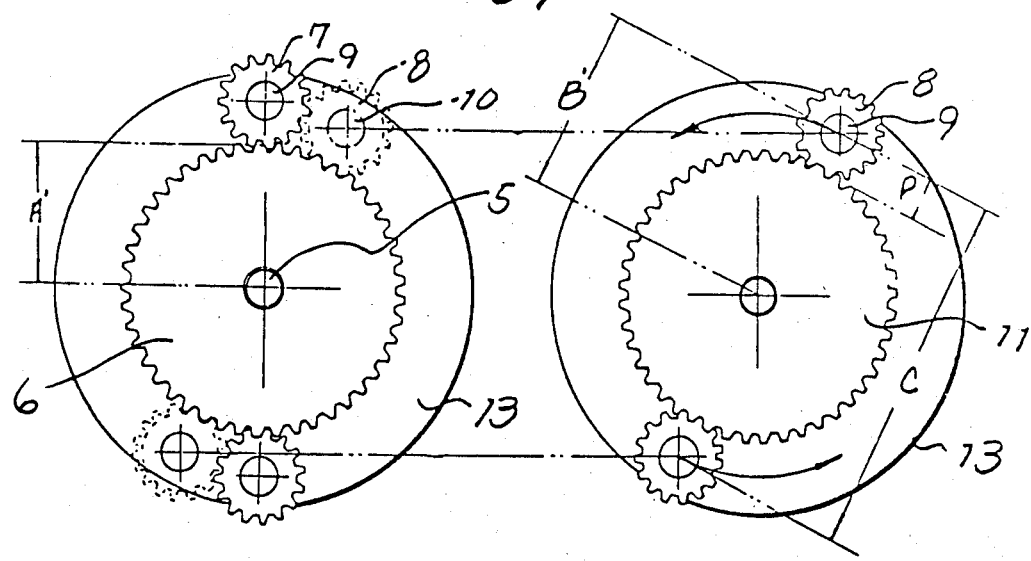

As illustrated in the FIG. 5B, in the counter gear train of the high speed system, link gears 7, 8 rotate along the circumference of the drive gear 6 and the stationary gear 11, and rotate the supporting plate 13 by means of the link gear pins 9, 10. Thus, the link gear shaft 14 rotates accordingly to deliver the power backwards.

In the inner counter gear train of the low speed system, as illustrated in the FIG. 5A, the drive gear 49 and the stationary gear 48 are internal gears of which inner circumference link gears 50, 51 rotate and the link gears rotate the supporting plate 54 and link gear shaft to deliver the power backwards.

Comparing the mutual operation of the two counter gear trains, the driving gears of both counter gear trains, as the radius A' each drive gear 5, 49 of the counter gear train V and the inner counter gear V₂ is identical, the two drive gears 6, 49 also rotate the first link gears 7, 50 to the same degree. The drive gears rotate the first link gears 7, 50 engaged thereto, and again rotate the second link gears 8, 51 engaged with the first link gears. The second link gear 8 of the high speed counter gear train V₁ rotates along the outer circumference of the held stationary gear 11, and the second link gear pin 10 rotates in the same direction with the original drive gear 6. Meanwhile, the second link gear 51 of the low speed inner counter gear train $V_2$ also rotates along the inner circumference of the held stationary gear 48, and the second link gear pin 53 accordingly rotates in the same direction with the drive gear 49. The link gear pins of the two gear trains are supported respectively by the link gear supporting pin 13, 54 and rotation of the link gear pins 10, 53 causes rotation of the supporting plate 13, 54 and the link gear shafts 14, 55 rotate accordingly.

As mentioned above, each drive gear 6, 49 of the two counter gear trains work under the same condition until they rotate the second link gear 8, 51. But if a load is loaded on the link gear supporting plates 13, 54 by the link gear shaft of the two counter gear trains, the rotation of the supporting plates 13, 54 will be different, because the link gear pins 10, 53 of the two rotate the supporting plates 13, 54 at different working points, respective 16. Since the high speed counter gear train $V_1$ works at a long distance B' from the center while the low speed inner counter gear train $V_2$ works at a short distance B from the center, the high speed counter gear train $V_1$ rotates the link gear supporting plate and the shaft 14 by a heavier power than the low speed inner counter gear train $V_2$. At this time, the rotation magnification of the supporting plates 13, 54 or the link gear shafts of the two counter gear trains to the one rotation of the drive gears are identical to each other being a 2/1 rotation.

As mentioned above, when the two counter gear trains bear the load, counteractions from the output to the input may be imagined. In light of such counteractions, the first link gears 7, 50 fall under the same condition as the above-mentioned second link gears 8, 51. Accordingly, the working points of the first link gear pins 9, 52 of the two counter gear trains are different with respect to each other.

Since the distances between the center of the high speed counter gear train $V_1$ and both the first and the second gear pins 9, 53 are equal with respect to each other, and the distances between the center of the low speed inner counter gear train $V_2$ and both the first and the second gear pins 52, 53 are also equal with respect to each other, the first link gear pin and the second link gear pin of both of the two counter gear trains work by means of the same link gear supporting plate, respectively, with a distance between each center link gear pins.

The high speed counter gear train $V_1$ has another twin second link gear 8' in addition to the second link gear 8 and accordingly, the two twin second link gear pins 10, 10' also are positioned symmetrically. The low speed inner gear train $V_2$ also includes symmetric second link gear pins 52, 53 and the twin link gear pins rotate the link gear supporting plate. Consequently, according to the distance between the twin second link gear, the link gear pins help the link gear supporting plate or the link gear shaft rotate.

Supposing that the distance between two pins is C and, as illustrated in the FIG. 5A, the radius of the drive gear is A', the radius of the link gear is D, the distance between the pins C of the high speed counter gear train $V_1$ may be equal to 2 (A+D). Here, since A' equals 45 and D equals 15, the distance C between two pins of the high speed counter gear train $V_1$ is equal to 2 (45+15), viz. 120 while that of the low speed inner counter gear train $V_2$ is equal to 2 (45−15), viz. 60 as shown in the FIG. 5A. Consequently, the high speed counter gear train $V_1$ is superior to the low speed counter gear train $V_2$ by being able to rotate the link gear shaft.

Returning to the above-mentioned subject, in the transmission, as the high speed system is superior to the low speed system by the ratio of 3 to 2 in the rotation magnification, the input of the main shaft is willing to choose the low speed system rather than high speed system under normal conditions as stated above. However, in case where the angle gear 76 rotates a large angle in the reverse direction to symmetrize the two systems with respect to each other, as illustrated in solid line in the FIG. 9, the high speed system having the counter gear train $V_1$ is superior to the low speed system having the inner counter gear train $V_2$ by the ratio of 2 to 1 in light of the structural principle of the two counter gear trains though the low speed system is superior to the high speed system by the ratio of 3 to 2 in light of the rotation magnification.

Putting the two ratios together, the high speed system is superior to the low speed system to the ratio of $2 \times 2$ to $3 \times 1$, viz. 4 to 3. Accordingly, as the two systems are symmetrized with respect to each other by the operation of the angle gear 76 as illustrated in the solid line in the FIG. 9B, the high speed system delivers the input to the output superior to the low speed system. To the contrary, as the two systems are symmetrized with respect to each other by the operation of the angle gear 76 in the solid line in the FIG. 9B, the low speed system is superior to the high speed system in delivering the input to the output. The superiority of one of the two systems results in changing the rotation magnification of the transmission and this is the function of the transmission.

As already explained above, whether it falls under the FIG. 9B, depends on which course of the low speed system will be forward at the sensitive adjustment gear train X, and whether one of the two courses are to be forward depends on the operation of the angle gear 76.

The operation of the angle gear will be explained as follows. The auxiliary adjustment gear train $X_2$ of the high speed system delivers the input of input shaft 65 to the main shaft 1 of the transmission. The sensitive adjustment gear train may be divided into the main adjustment gear train $X_2$, the auxiliary adjustment gear train $X_3$ and the adjustment gear train $X_1$. The main and the auxiliary adjustment gear trains $X_2$, $X_3$ are composed of differential gears, which are identical with those in the distribution gear train or the junction gear train, and include the adjustment drive gear 74, the idle gear 75, the angle gear 76 and the adjustment spring gear 79.

The function of each train of the sensitive adjustment gear trains X is hereinafter described. The input of the input shaft 65 delivers the power to the main shaft 1 of the transmission. The power delivering course may be tracked as follows: input shaft 65—input shaft gear 66—external gear 67 of the main adjustment gear train—internal gear shaft 68—internal gear 69—planetary gear 70—main drive gear 71—main shaft 1. Through the above course, input runs the transmission by rotating the main shaft 1. But when a burden is levied on the output of the transmission part, this may be regarded as the counteraction against the input. Such a reaction makes it hard to rotate the main shaft 1 of the transmission part by the input. The input and the reaction come to run the planetary gear pin 72 of the main adjustment gear train and further, the adjustment spring gear 79 of the adjustment gear train or the angle gear.

The adjustment spring gear 79 and the sensitive adjustment gear trains X are operated by the input through the following power delivering course: input shaft 65—input shaft gear 66—external gear 67 of the main adjustment gear—external gear shaft 68—internal gear 69—planetary gear 70—planetary gear pin 72—drive gear shaft 73—drive gear 74—idle gear 75 by the rotation of the angle gear 76 and idle gear shaft 78—adjustment spring gear 79 of the adjustment gear train via idle gear shaft 78—spring rack gear 80—adjustment spring 81 pressed by the adjustment spring seat 82.

Since the pressure on the adjustment spring derives from the reaction of the load side via the sensitive adjustment gear trains, the pressure levied on the adjustment spring 81 depends on the amount of the load. The adjustment spring 81 works together with the adjustment spring gear 79 and idle gear 75, and the idle gear is engaged with the angle gear 76 when the load is levied to a large extent, the adjustment spring is pressed accordingly and vice versa. In the low speed system, the operation of the angle gear 76 affects the sensitive adjustment gear train X via the auxiliary adjustment gear train $X_3$ and the inner counter gear train $V_2$ to perform transmission.

FIG. 11 illustrates the power delivering course wherein the input affects the adjustment gear train $X_1$ by the reaction of the output side via the main and the auxiliary adjustment gear trains $X_2$ and $X_3$.

Figure 14:
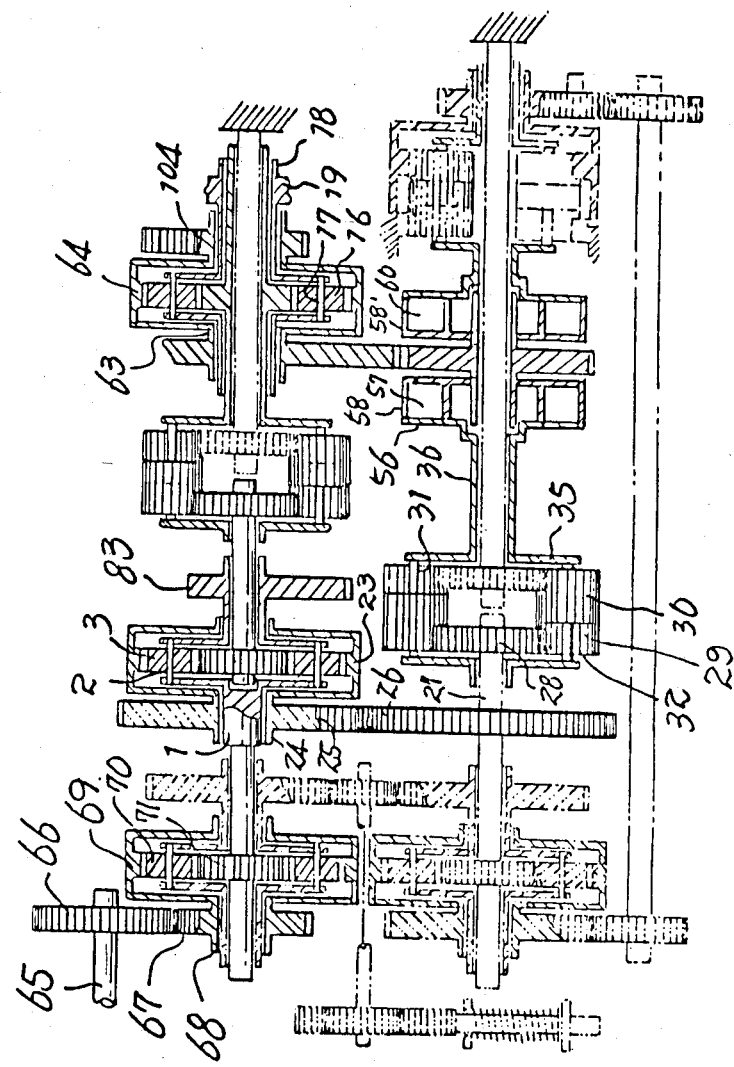
FIG. 14 is an illustration of the drive gear train of the present invention at low speed.

FIG. 14 illustrates the power delivering course wherein the input is converted into low speed and delivered to the output when the angle gear rotates in the positive direction according to an increase in the load.

Figure 13:
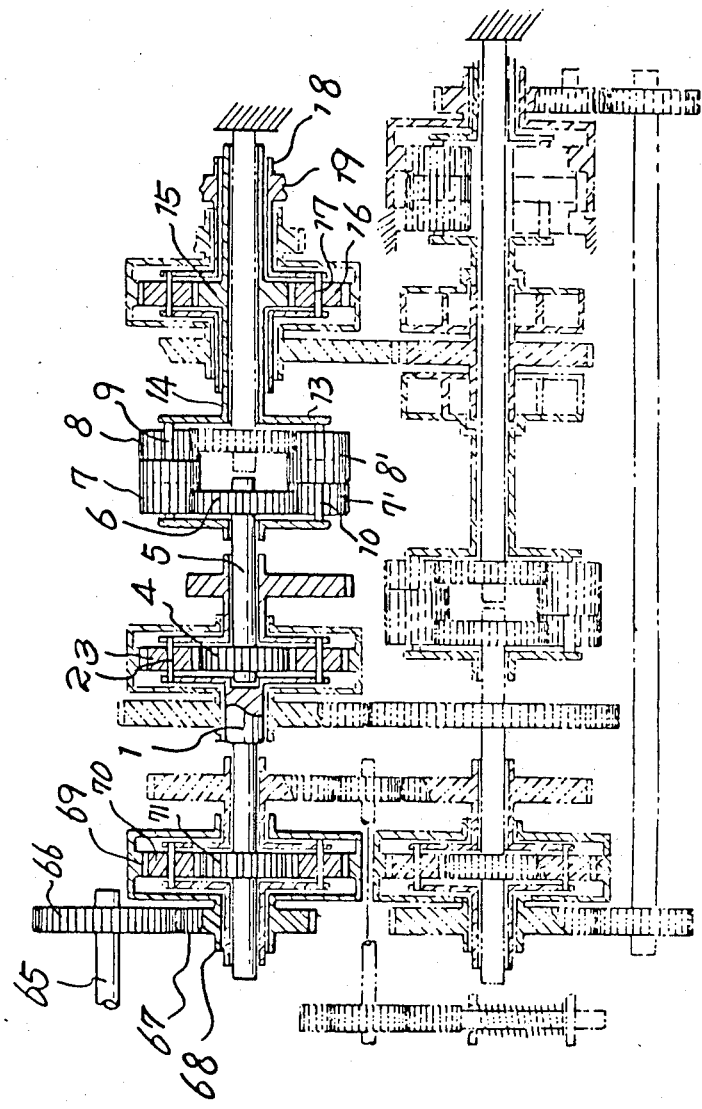
FIG. 13 is an illustration of the drive gear train of the invention at high speed.

FIG. 13 illustrates the power delivering course wherein the input is converted into high speed and delivered to the output when the angle gear rotates in the negative direction by the expansion of the adjustment spring according to a decrease in the load.

A change in the rotation speed is made as illustrated in FIGS. 13 and 14. However, when adequate rotation of the load is made, the rotation should be maintained. In this case, power is delivered as illustrated in FIG. 12.

When the main shaft 1 which may be called the input of the above-mentioned transmission part rotates one time, the rotation magnification between the main shaft and the timing gear 62 is as illustrated FIG. 10A, and between the input shaft 65 and the timing gear is as illustrated in FIG. 10B. In FIG. 10A, as the input shaft 65 rotates one rotation per two rotations of the main shaft 1, the rotation number of the timing gear 62 in FIG. 10B is indicated as twice the number of that in FIG. 10A.

As mentioned above, conversion of the input to the output or maintenance of the output is the main function of the transmission. In addition, there are neutral parts and reverse parts which perform the functions accompanying with the main function.

Reviewing FIG. 10A, the output magnification of one rotation of the main shaft is zero. At this time, the rotation number of the timing gear is 3/2. Namely, if the timing gear makes 3/2 rotation, the output rotation is zero.

The neutral part is necessary for establishing the following condition. The power delivering course in neutral is as follows: rotation of the input shaft 1—neutral drive gear 83—connecting drive gear 84—clutch drive gear 85—clutch gear shaft 86—input clutch plate 87—mobile clutch plate 105—output clutch plate 88—main drive gear shaft 97 of the neutral gear train—main drive gear 96—as the output doesn't operate, the planetary gear 95 rotates along the inner circumference of the internal gear 94 under a condition wherein the internal gear 94 engaged with the output stands still—the planetary gear pin 98—idle drive gear shaft 99—idle drive gear 100—idle reverse gear 101—idle reverse gear shaft 102—idle reverse engaged gear 103—idle operating gear 104. Since the rotation of the idle operating gear 104 corresponds to that of the timing gear 62, one rotation of the input shaft 1 corresponds to 3/2 rotation of the timing gear 62, as indicated in FIG. 10A.

The condition set forth above may be considered reversely in input to output. Namely, the output may work under a certain condition though the input doesn't work through the following course: the output shaft 22—the output gear 21—the internal gear shaft 93 of the neutral gear train—the internal gear 94—as the main gear 96 of the input part is deemed not to operate, the planetary gear 95 rotates along the circumference of the main gear 96—the planetary gear pin 98—the idle drive gear shaft 99—the idle drive gear 100—the idle reverse gear 101—the reverse gear shaft 102—the idle reverse engaged gear 103—the idle operating gear 104—the timing gear 62. At this time, the torque from the output does not act on the input shaft 1 of the transmission.

As in the two cases, when the neutral clutch 89 is connected, the input and the output cut off without acting reciprocally. The clutch connecting gear 92 of the neutral clutch is established to connect with the jagged part of the input clutch plate by rotating the mobile clutch plate while the input acts on the output.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic stepless transmission comprising:
   a high speed gear system having a distribution gear train wherein an input to said high speed gear system is distributed by said distribution gear train to a high speed counter gear train having an output driving a junction gear train, wherein an output of said high speed gear system is produced through said distribution gear train to said high speed counter gear train and from said high speed counter gear train to said junction gear train;
   a first low speed gear system operatively connected to said distribution gear train and having an output driving an outer counter gear train and a spring type high and low adjustment gear train having an output operatively connected to a junction gear train directly connected to the output;
   a second low speed gear system operatively connected to said distribution gear train and having an output driving an auxiliary adjustment gear train having an output driving an inner counter gear train, the spring type high and low speed adjustment gear train and the junction gear train which is directly connected to the output;
   an input of said first and second low speed gear systems being distributed by said distribution gear train;

an output of said first and second low speed gear systems being produced through said distribution gear train said spring type high and low adjustment gear train and the junction gear train via said low speed outer counter gear train or said auxiliary adjustment gear train and said inner counter gear train;

a neutral clutch train;

a neutral gear train operatively positioned at the output of said high and low speed gear systems;

a main adjustment gear train operatively connected to a sensitive adjustment gear train;

wherein the load on the output in said high and first and second low speed gear systems is selectively regulated by said main adjustment gear train and auxiliary gear train depending on speed changes.

2. An automatic stepless transmission according to claim 1, wherein the distribution gear train and the junction gear train of the high and first and second low speed gear systems include common differential gears, and said outer counter gear trains of the high and first low speed gear systems include drive gears and stationary gears, respectively, said drive and stationary gears being circumferentially engaged with first and second link gears, respectively, said link gear being arranged in pairs in a side-by-side relationship between a supporting plate and each pair being mounted on a common gear shaft.

3. An automatic stepless transmission according to claim 1, wherein said inner counter gear train of said second low speed system includes a stationary gear and an internal gear operatively mounted on a stationary gear shaft, said first and second link gears being operatively engaged with said stationary gear and said internal gear, respectively, said first and second link gears being mounted on a gear shaft positioned between said supporting plate.

4. An automatic stepless transmission according to claim 1, wherein the spring type high and low speed adjustment gear train includes a spring drive gear, a high spring fixing plate positioned on one side of said spring drive gear and a low spring fixing plate positioned on the other side of said spring drive and high and low speed springs positioned within said high and low spring fixing plates, respectively, for compressing said high and low speed springs.

5. An automatic stepless transmission according to claim 1, wherein the main and the auxiliary adjustment gear trains of the sensitive adjustment gear trains include common differential gears, a drive gear and angle gear being connected by an idle gear and said adjustment gear train including a spring rack gear operated by the spring engaged with the adjustment spring gear and being positioned on the same shaft with the idle gear.

6. An automatic stepless transmission according to claim 1, wherein the high and the first and second low speed systems are selected depending on whether the second low speed inner counter gear train or the first low speed outer counter gear train is symmetrical above the high speed counter gear train.

* * * * *